C. MOORE.
WIND SHIELD CANOPY.
APPLICATION FILED JAN. 18, 1918.
1,289,226.
Patented Dec. 31, 1918.
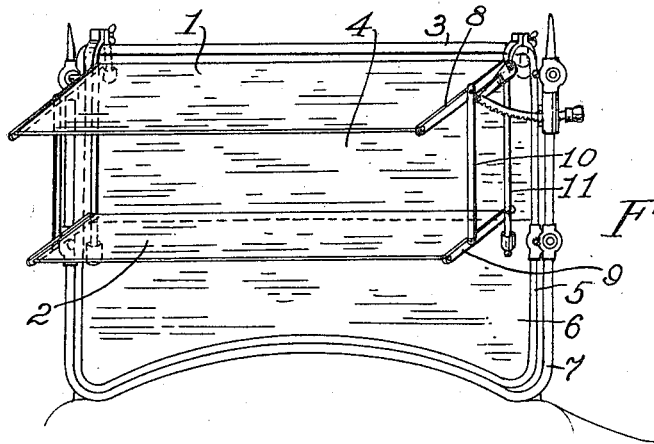
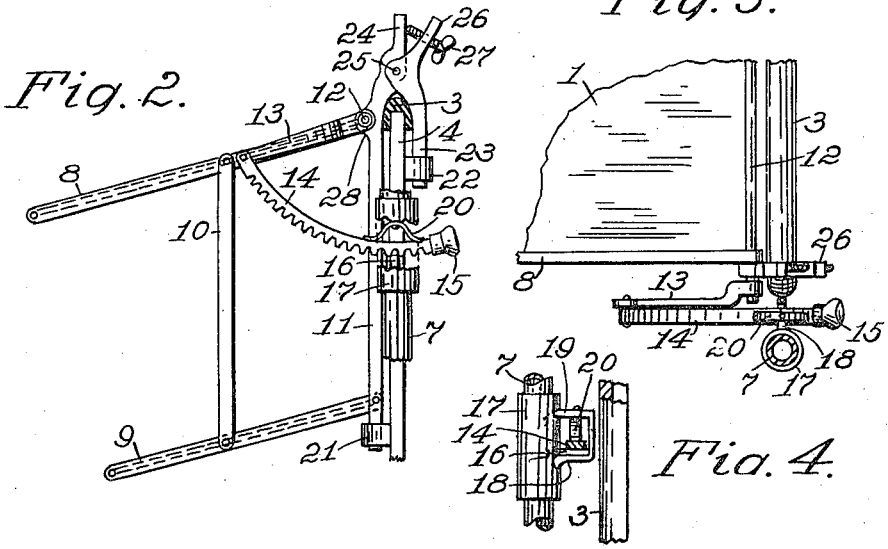
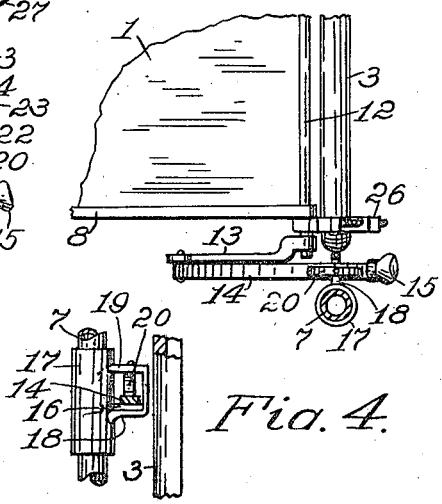
Inventor,
Claude Moore,
by G.C. Kennedy,
Attorney.

UNITED STATES PATENT OFFICE.

CLAUDE MOORE, OF WATERLOO, IOWA.

WIND-SHIELD CANOPY.

1,289,226.      Specification of Letters Patent.      Patented Dec. 31, 1918.

Application filed January 18, 1918. Serial No. 212,418.

*To all whom it may concern:*

Be it known that I, CLAUDE MOORE, a citizen of the United States of America, and a resident of Waterloo, Blackhawk county, Iowa, have invented certain new and useful Improvements in Wind-Shield Canopies, of which the following is a specification.

My invention relates to improvements in wind shield canopies for motor-vehicles, and the objects of my improvements are, first, to furnish adjustable colored transparent canopies for a wind shield, which will protect the shield from rain or moisture while obscuring most of the glare from the sun or from a brilliant light in the way, without preventing a proper view of the course to be traversed, and second, to provide convenient and accessible adjustable actuating means for tilting said canopies to a necessary angle and retaining them releasably in that position.

These objects I have accomplished by the means which are hereinafter described and claimed, and which are illustrated in the accompanying drawings, in which Figure 1 is a perspective view of the front of a wind shield of a vehicle, equipped with my improved adjustable canopies; Fig. 2 is an enlarged end elevation of the upper part of said wind shield and said canopies with their actuating mechanism mounted thereon; Fig. 3 is a fragmental plan view of said mechanism and its mountings and connections to said canopies, and Fig. 4 is a fragmental rear elevation of the supporting-means for the rack-sector or bar.

Similar numerals of reference denote corresponding parts throughout the several views.

Referring first to said Fig. 1, the numeral 7 denotes the substantially rectangular hollow frame of a wind shield mounted fixedly upon the body of a vehicle such as a motor-car. Within said frame are the jointed supporting frames of the sectional wind shield, as shown at 3 and 5 containing the transparent wind shield parts or plates 4 and 6 respectively, the frame parts 3 and 5 being pivoted to the upright parts of the outer frame 7 to permit of their independently tilting in the usual manner.

My improved canopy or adjustable shade for said wind shield plates 4 and 6 is removably mounted upon the upper horizontal part of the upper shield frame 3. The removable mounting comprises a pair of like clamping-members positioned at opposite ends of said frame part 3 to releasably clamp thereon. The clamping-members 11 and 23 are of unequal length, with the longer member 11 depending before the wind shield, the other and shorter member 23 depending to the rear of the wind shield, and rubber or other elastic contact-blocks 21 and 22 mounted on said members to engage the plate or plates of the wind shield on opposite sides thereof. These clamping members are seated upon and clamped upon said frame part 3, as shown in Fig. 2, and are pivoted together at 25 above said frame part 3 and have upright terminations 24 and 26 respectively. The termination 26 is provided with an interiorly-threaded orifice to receive a thumb-screw 27 whose extremity bears against the termination 24, whereby when the screw is turned to tighten it against said termination 24, the lower depending clamping-members 11 and 23 are clamped tightly upon the frame part 3, with their elastic blocks 21 and 22 engaging front and rear faces of the wind shield.

Each forward clamping-member 11 has on its upper forward edge a widening or boss 28 orificed to receive a rod 12 pivotally. Fixed on the end parts of this rod are the grooved arms 8, parallel to each other, projecting forwardly, and in whose longitudinal grooves the ends of the upper canopy plate 1 are mounted fixedly. Another rod is fixedly connected between the forward extremities of said arms. Other and shorter arms 9 have their rear ends pivoted to the lower parts of the forward clamping-members 11, to extend forwardly parallel with each other, and also parallel with the arms 8 above them and spaced therefrom. The forward extremities of the arms 9 are likewise connected by a fixed rod, and said arms are also grooved on their inner faces to receive the ends of a canopy plate 2 fixedly, and narrower than said upper plate 1. The numeral 10 denotes a link-bar on each side of said canopies, whose ends in each case are pivotally connected to the arms 8 and 9.

To swing said canopies simultaneously to adjusted positions, I employ the following described mechanism, which, however can be considerably departed from in details of construction without removal from the scope of my invention. As shown, this mechanism comprises an arm 13 fixed on one end of the rod 12 to project forwardly therefrom parallel to the upper canopy arm 8 and extending nearly to the pivotal connection of the link 10. A curved rack-bar 14 has its forward extremity pivoted to the forward extremity of said arm 13 and extends rearwardly through the interspace of the frame parts 7 and 3 at one side and is furnished with a terminal knob 15.

The numeral 17 denotes a sleeve fixedly mounted on the frame part 7 and which carries a fixed looped bracket 19, as shown in said Fig. 4, the same extending toward the casing part 3, and its upper horizontal member having a curved plate spring 20 medially secured to its under face to contact with its ends the upper edge of the curved rack 14. The lower horizontal member of said bracket has an integral upright detent 16 adapted to underlie said rack 14 to engage roots of the teeth thereof. The vertical component of said bracket serves to support the horizontal parts and inclose the rack-bar.

To actuate said canopies together and adjust their altitudes of inclination, it is merely necessary to lift up on the rack 14 by means of its knob 15 to compress the spring 20, releasing it from the detent 16, so that it may be shifted forward or back as much as necessary, so that when released, the reaction of said spring will return the rack into engagement with said detent in the adjusted position of the rack.

This adjustment requires the use of but one hand of the chauffeur, and is quickly and easily performed.

But one canopy 1 may be used, while on the other hand, a plurality of linked canopies may be employed, without departing from my invention.

An important feature of usefulness of my improved device consists in the use of transparent colored canopy plates 1 and 2 made of glass or other transparent material. The plates may be tinted or colored suitably or clouded or "smoked" to thereby render them less capable of transmitting light, while not materially interfering with visibility therethrough of the course or way ahead to be traversed. This is done, in order to dim the blinding glare of a light ahead, such as an undimmed head-light on a car or train or building, or even the light of the sun, when the latter is nearing the horizon. The chauffeur actuates the adjusting mechanism to place the canopy plate 1 at an inclination requisite to cover or be interposed between the glaring light and himself, which permits him to observe the light without being dazzled by it, while allowing him a clear and unobstructed vision of the way ahead and below the light. The lower canopy plate 2 in a like manner covers a lower light which is being approached, without interfering with a view of the way immediately ahead, and cuts off reflections due to the action of the lights on the plates of the canopies and the wind shield. The canopies, of course, serve an important purpose in keeping off rain or snow from the front face of the wind shield.

Having described my invention, what I claim as new, and desire to secure by Letters Patent, is:

1. In a device of the character described, a transparent wind shield, a pair of vertically-spaced canopies, both supported pivotally over one face of the wind shield, linking-means between said canopies, and means for swinging said canopies to desired positions relative to the wind-shield and retaining them releasably in the adjusted positions.

2. In a device of the character described, a transparent wind shield, transparent canopies swingingly supported over one face of the wind shield, connecting-links between the canopies to permit them to swing together synchronously, a detent on the wind shield, and a rack pivoted on one canopy movable over said detent and adapted to mesh therewith in adjusted positions, and resilient means adapted to yieldingly retain said rack in mesh with said detent.

Signed at Waterloo, Iowa, this 31st day of Dec. 1917.

CLAUDE MOORE.